Patented Apr. 27, 1954

2,676,940

UNITED STATES PATENT OFFICE 2,676,940

HEAT AND LIGHT-STABILIZED HALOGEN CONTAINING POLYMERIC COMPOSITIONS

Allen S. Kenyon, Dayton, Ohio, assignor to Monsanto Chemical Company, St. Louis, Mo., a corporation of Delaware No Drawing. Application February 25, 1952, Serial No. 273,343

10 Claims. (Cl. 260—30.6)

This invention relates to new stabilized plastic compositions comprising a halogen-containing polymeric material and an unsaturated alcohol which renders an improved stability of the composition to heat and light.

It is well known that halogen-containing polymeric compositions are in general unstable toward heat and light. They decompose with the evolution of traces of hydrogen halide, the presence of which further catalyzes the decomposition. On decomposition the polymeric composition develops a yellow coloration which darkens to brown and badly decomposed samples become black. In view of the fact that the hydrogen halide catalyzes further decomposition thick halogen-containing polymeric films exhibit a greater instability than thin films. Also the development of chromophores containing a conjugated system of ethylenic bonds through dehydrohalogenation of the polymer probably accounts in part for the discoloration of the polymer. Whereas the formation of the degradation color and mechanism of the stabilization are not fully understood, numerous materials have been suggested to correct this deleterious effect. It has been suggested that the halogen-containing polymer is stabilized by removal of the trace of hydrogen halide as formed, thereby substantially preventing the decomposition from becoming autocatalytic and also by elimination of the chromophoric group. Previously suggested stabilizers are basic substances such as amines which bind the free acid. Numerous metallic oxides, metallic salts and especially organo-metallic compounds have also been suggested. Many of these compounds, while acting as good stabilizers, are objectionable as they are not readily compatible with the halogen-containing polymer and often produce products which lack clarity. Further, many of the prior art stabilizers are too toxic to be allowed in film or containers intended for use with food products. One of the best representative stabilizers of the organometallic class is dibutyl tin maleate, however, this stabilizer produces translucent rather than transparent articles due to the relative incompatibility of the stabilizer, is toxic, and is an expensive compound.

The principal object of this invention is the preparation of halogen-containing polymeric compositions which are characterized by improved stability on exposure to heat and/or light. Another more specific object of this invention is the preparation of vinyl chloride-containing compositions stabilized against discoloration on exposure to heat and/or light by the addition of ethylenic unsaturated alcohols, as, for example, 9-octadecen-1-ol. Additional objects will be apparent from the following detailed description of the invention.

It has now been found that halogen-containing polymeric compositions can be stabilized against heat and light decomposition by the addition of less than about 10 per cent and preferably from about 0.5 to about 5 per cent and more preferably still from about 0.5 to about 3 per cent, based on the weight of the polymer composition, of an aliphatic ethylenic alcohol containing from 10 to 18 carbon atoms, wherein the ethylenic bonds are the sole unsaturated bonds of the molecule and are nonconjugated.

Whereas this invention is directed primarily to the vinyl chloride-containing compositions, it is equally applicable to the general class of halogen-containing polymers, as for example, vinyl chloride, vinyl fluoride, vinylidene chloride, 1-chloro-1-fluoroethylene, chlorotrifluoroethylene, chlorostyrene, etc. In addition to the copolymers of, for example, vinyl chloride with the aforementioned halogen-containing monomers, the vinyl chloride can be polymerized with other copolymerizable monomer, for example, vinyl acetate, acrylonitrile, acrylic acid, methyl acrylate, methyl methacrylate, vinyl ethyl ether, styrene, etc. In general, it is preferable that the copolymer compositions contain at least about 80 per cent of the vinyl chloride and up to about 20 per cent of the copolymerizable monomer.

Suitable alcohols can be defined by the formula: ROH, wherein R is a 10 to 18 carbon atom-containing hydrocarbon radical having one or more nonconjugated ethylenic bonds, as, for example:

3,7-dimethyl-1,6-octadien-3-ol
3,7-dimethyl-2,6-octadien-1-ol
3,7-dimethyl-6-octen-1-ol
2-ethylidene-1-octanol
9-decen-1-ol
9-hendecen-1-ol
9-dodecen-1-ol
9-tetradecen-1-ol
9-hexadecen-1-ol
9-octadecen-1-ol
6-octadecen-1-ol
9,12-octadecadien-1-ol
6,10,14-hexadecatrien-1-ol
9,12,15-octadecatrien-1-ol and the like, and mixtures thereof.

The present invention pertains primarily to the stabilized halogen-containing polymer compositions. In combination with the resins and ethylenic alcohol stabilizers, defined above, other conventional additives can be employed, as, for example, pigments, dyes, fillers, lubricants, plasticizers, etc. The plasticizers are the most important of the above group of additives and are normally added to the extent of from about 20 to about 50 per cent by weight of the total composition. Examples of suitable prior art plasticizers are:

Di-2-ethylhexyl phthalate
2-ethylhexyl diphenyl phosphate
Tricresyl phosphate
Tri-2-ethylhexyl phosphate
Dicapryl phthalate
Dibutoxyethyl phthalate
Di-2-ethylhexyl adipate
Tributyl citrate
Triethylene glycol di-2-ethylhexoate Polyvinyl chloride is the most important of the halogen-containing polymeric compositions and the following illustrative examples are, therefore, directed to this composition, but it is not intended that this should be considered as limitative thereof.

Example 1

The polymeric compositions comprising the halogen-containing polymer, the stabilizers of this invention and other additives, as for example, plasticizers, were milled at about 325° F. for about five minutes to obtain homogeneous compositions. The milled compositions were then molded at about 325° F. to obtain thin films and bars of 1/8 inch thickness. For the most part the molded bars were tested by subjecting to ultraviolet radiation or heat or a combination of both since the thick sample discolors more readily than a thin film when improperly stabilized.

Sixty parts by weight of polyvinyl chloride were milled with 40 parts by weight of 2-ethylhexyl diphenyl phosphate and test samples prepared as indicated above. The test samples so produced were then exposed for 24 hours to a high pressure mercury arc ultraviolet lamp, other samples were heated at about 275° F. for about two hours and portions of the test samples exposed to the ultraviolet light for 24 hours were subsequently also exposed to temperatures of about 275° F. The samples so tested were a light brown after exposure to ultraviolet light, a dark brown after exposure to heat, and black after exposure to light and heat.

Similar samples were prepared containing 62 parts by weight of polyvinyl chloride, 38 parts by weight of 2-ethylhexyl diphenyl phosphate and 7.7 parts by weight of 9-octadecen-1-ol. When these test samples were treated under the same conditions to the aforementioned control sample the stabilized composition remained transparent after all tests and was a light yellow after exposure to ultraviolet light, a light brown after exposure to heat, and slightly yellow after exposure to light and heat. A similar composition containing about 5 per cent 9-octadecen-1-ol gave substantially the same test results as the preceding composition.

Example 2

In a similar manner to the procedure described in Example 1, the following compositions of (A) polyvinyl chloride, (B) di-2-ethylhexyl phthalate, and (C) stabilizer were prepared, all quantities being in parts by weight.

| Sample | A | B | C |
|---|---|---|---|
| 1 | 60 | 40 | None. |
| 2 | 60 | 40 | 1 of dibutyl tin maleate. |
| 3 | 60 | 40 | 1 of 9-octadecen-1-ol. |
| 4 | 61 | 39 | 2 of 9-octadecen-1-ol. |
| 5 | 61 | 39 | 3 of 9-octadecen-1-ol. |
| 6 | 61 | 39 | 5 of 9-octadecen-1-ol. |
| 7 | 62 | 38 | 3 of 3,7-dimethyl-1,6-octadien-3-ol. |
| 8 | 62 | 38 | 3 of approximately 50-50 mixture of 9-octadecen-1-ol and 9,12-octadecadien-1-ol. |

These samples were then tested under similar conditions to those described in Example 1. The control samples (1) when subjected to ultraviolet radiation, heat and light plus heat were respectively, light yellow, dark yellow, and brown. The samples stabilized with dibutyl tin maleate were translucent rather than transparent and were respectively, substantially unchanged, a very light yellow, and substantially unchanged. The samples, 3 through 6 inclusive, were transparent and showed little change on exposure to ultraviolet light, but developed a slight yellow coloration on exposure to heat and ultraviolet light plus heat. In addition a test extrusion was made on the composition of sample 5; the milled sample being extruded at 400° F. and the resulting product found to be clear and colorless. Sample 7 showed little degradation upon exposure to heat and light. Sample 8 was a very light yellow after exposure to light and was also yellowish after exposure to light and heat, but it was noted that the stabilized mixture was impure, being slightly yellow.

Example 3

In a similar manner to that disclosed in the above examples, compositions comprising 62 parts polyvinyl chloride, 38 parts plasticizer and 3 parts 9-octadecen-1-ol were prepared wherein the plasticizers were, respectively, di-2-ethylhexyl adipate and triethylene glycol di-2-ethylbutyrate. Here, too, the specific ethylenic alcohol exhibited improved stability to both heat and light over the control samples, indicating general utility with various plasticizers.

I claim:

1. A heat and light stabilized halogen-containing polymer comprising said polymer and as a stabilizer therefor from about 0.5 to about 10 per cent, based on the weight of the polymer, of an aliphatic ethylenic alcohol containing from 10 to 18 carbon atoms, wherein the ethylenic bonds are the sole unsaturated bonds of the molecule and are nonconjugated, and mixtures thereof, and the stabilized polymer is characterized by an improved resistance to discoloration by exposure to heat and light.

2. A heat and light stabilized halogen-containing polymer comprising said polymer and as a stabilizer therefor from about 0.5 to about 5 per cent, based on the weight of the polymer, of an aliphatic ethylenic alcohol containing from 10 to 18 carbon atoms, wherein the ethylenic bonds are the sole unsaturated bonds of the molecule and are nonconjugated, and mixtures thereof, and the stabilized polymer is characterized by an improved resistance to discoloration by exposure to heat and light.

3. A heat and light stabilized chlorine-containing polymer comprising said polymer and as a stabilizer therefor from about 0.5 to about 5 per cent, based on the weight of the polymer, of an aliphatic ethylenic alcohol containing from 10 to 18 carbon atoms, wherein the ethylenic bonds are the sole unsaturated bonds of the molecule and are nonconjugated, and mixtures thereof, and the stabilized polymer is characterized by an improved resistance to discoloration by exposure to heat and light.

4. A heat and light stabilized resin containing polyvinyl chloride comprising the resin and as a stabilizer therefor from about 0.5 to about 5 per cent, based on the weight of the resin, of an aliphatic ethylenic alcohol containing from 10 to 18 carbon atoms, wherein the ethylenic bonds are the sole unsaturated bonds of the molecule and are nonconjugated, and the stabilized resin is characterized by an improved resistance to discoloration by exposure to heat and light.

5. A heat and light stabilized vinyl chloride resin which comprises a polymer of at least about 80 percent of vinyl chloride and up to about 20 per cent of a copolymerizable monomer, containing intimately dispersed therein as a stabilizer therefor from about 0.5 to about 5 per cent, based on the weight of the resin, of an aliphatic ethylenic alcohol containing from 10 to 18 carbon atoms, wherein the ethylenic bonds are the sole unsaturated bonds of the molecule and are nonconjugated and the stabilized resin is characterized by an improved resistance to discoloration by exposure to heat and light.

6. A heat and light stabilized chlorine-containing polymer composition comprising a plasticized vinyl chloride resin, wherein the polymer consists of at least about 80 per cent of vinyl chloride and up to about 20 per cent of a copolymerizable monomer, and as a stabilizer therefor from about 0.5 to about 5 per cent, based on the weight of the plasticized resin, of an aliphatic ethylenic alcohol containing from 10 to 18 carbon atoms, wherein the ethylenic bonds are the sole unsaturated bonds of the molecule and are nonconjugated, and the stabilized polymer is characterized by an improved resistance to discoloration by exposure to heat and light.

7. A composition comprising a vinyl chloride polymer, wherein the polymer consists of at least about 80 per cent of vinyl chloride and up to about 20 per cent of a copolymerizable monomer, a plasticizing amount of di-2-ethylhexyl phthalate and as a heat and light stabilizer therefor, from about 0.5 to about 5 per cent of 9-octadecen-1-ol.

8. A composition comprising a vinyl chloride polymer, wherein the polymer consists of at least about 80 per cent of vinyl chloride and up to about 20 per cent of a copolymerizable monomer, a plasticizing amount of di-2-ethylhexyl phthalate and, as a heat and light stabilizer therefor, from about 0.5 to about 5 per cent of a mixture of about 50 per cent of 9-octadecen-1-ol and about 50 per cent of 9,12-octadecadien-1-ol.

9. A composition comprising a vinyl chloride polymer, wherein the polymer consists of at least about 80 per cent of vinyl chloride and up to about 20 per cent of a copolymerizable monomer, a plasticizing amount of di-2-ethylhexyl phthalate and, as a heat and light stabilizer therefor, from about 0.5 to about 5 per cent of 3,7-dimethyl-1,6-octadien-3-ol.

10. A composition comprising a vinyl chloride polymer, wherein the polymer consists of at least about 80 per cent of vinyl chloride and up to about 20 per cent of a copolymerizable monomer, a plasticizing amount of 2-ethylhexyl diphenyl phosphate and, as a heat and light stabilizer therefor, from about 0.5 to about 5 per cent of 9-octadecen-1-ol.

References Cited in the file of this patent

UNITED STATES PATENTS

| Number | Name | Date |
|---|---|---|
| 2,501,647 | Ney | Mar. 21, 1950 |